July 3, 1962 — J. J. LENCIONI — 3,042,350
CHRISTMAS TREE STAND
Filed July 26, 1960 — 2 Sheets-Sheet 1

INVENTOR.
Julius J. Lencioni
BY Olson & Trexler
Attys

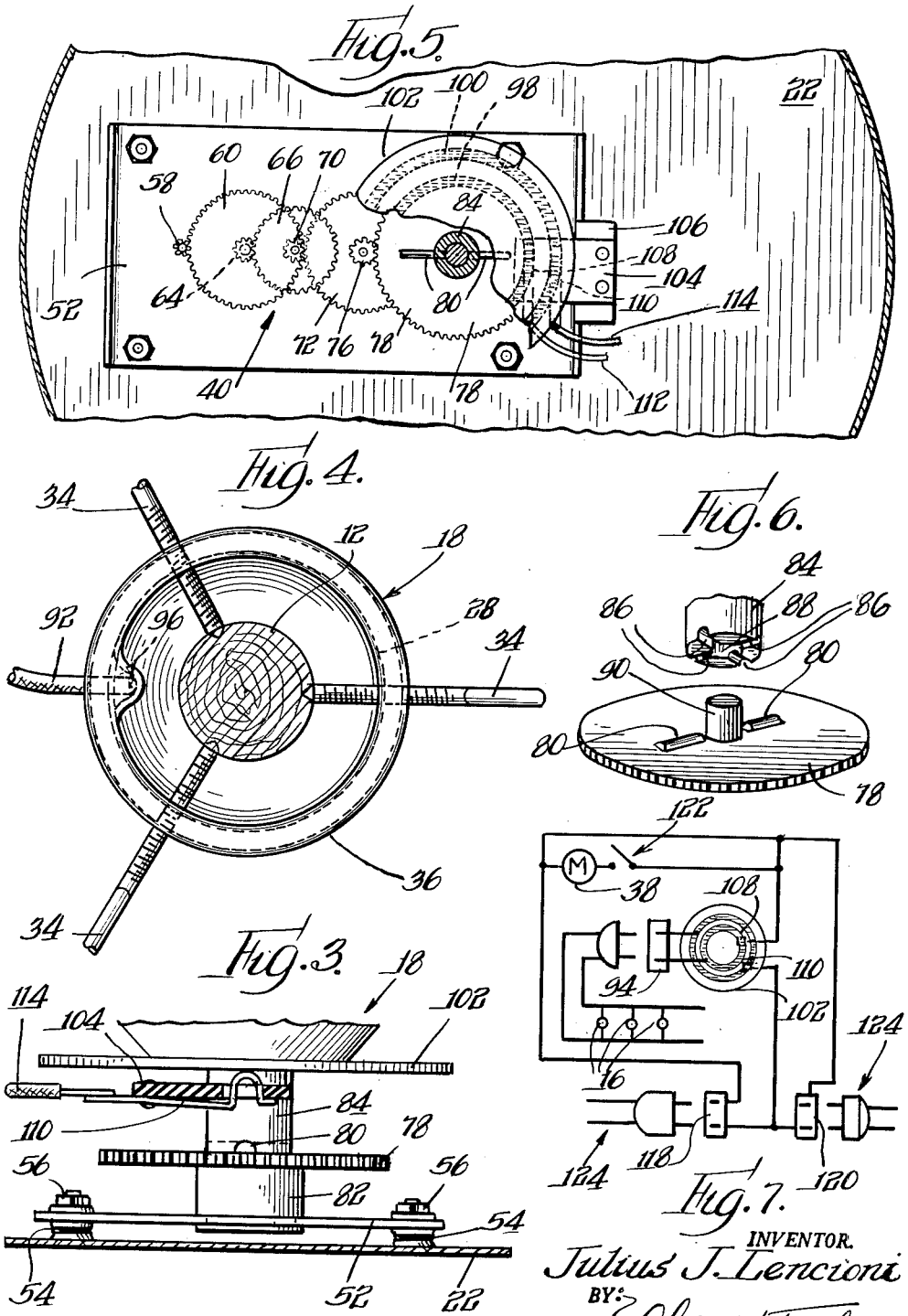

3,042,350
CHRISTMAS TREE STAND

Julius J. Lencioni, Chicago, Ill., assignor to Mell-Hoffmann Manufacturing Company, Chicago, Ill., a corporation of Delaware
Filed July 26, 1960, Ser. No. 45,347
2 Claims. (Cl. 248—45)

This invention relates generally to devices for supporting and displaying Christmas trees and especially to such devices that are adapted to revolve the tree about the axis of its stem.

The display stand of the present invention is particularly useful when a revolving movement of the Christmas tree is desired in order to enhance its decorative effect, such as for example in commercial establishments or in the picture window of a residence. The prior art devices are commonly embodied to revolve a metal tree or a flocked natural tree with illumination being provided by separately arranged floodlights. This, of course, restricts the decorative effects that can be obtained. It is, therefore, an object of the present invention to provide a new and improved display stand which can be used to revolve either an artificial tree or a natural tree and which allows decoration of the supported tree with conventional strings of lights whether the tree is revolved or is allowed to remain stationary.

A display stand of the type exemplified must necessarily present no substantial electrical hazards; otherwise, its use would be strictly limited. Hence, it is another object of the invention to provide a display stand which can be used to revolve either an artificial tree or a natural tree and which allows decoration of the supported tree using conventional strings of lights without the incurrence of electrical hazards.

Still another object of the invention is to provide a display stand of the type described which allows rotational movement of the tree to be stalled without tipping the tree or damaging the mechanism when an obstruction is encountered.

Yet another object of the invention is to provide a display stand for Christmas trees and the like which allows a natural tree to be watered without incurring the danger of leakage.

A further object of the invention is to provide a display stand which incorporates a self-centering mounting for the tree and which is characterized by easy installation of the tree in the stand.

A still further object of the invention is to provide a rotating display stand which is highly stable and which is quiet in operation.

Additional objects and features of the invention pertain to the particular structure and arrangements whereby the above objects are attained.

A structure in accord with the invention includes a stable base support including a floor-engaging plate and throat-defining means spaced above the plate; unitary cup means rotatably mounted in the throat-defining means and adapted to receive the basal stem of a Christmas tree; means for rotating the cup means relative to the base support including drive means and overriding clutch means; means providing electrical connection for lights arranged on the Christmas tree including slip rings associated with the cup means and rotated therewith; and circuit means for selectively energizing the drive means and the lights.

The invention, both to its structure and mode of operation, will be better understood by reference to the following disclosure and drawings forming a part thereof, wherein:

FIG. 3 is an enlarged view taken through the section 3—3 of FIG. 2;

FIG. 4 is a view taken through the section 4—4 of FIG. 2;

FIG. 5 is a view taken through the section 5—5 of FIG. 2;

FIG. 6 is an enlarged, exploded perspective view of the overriding clutch utilized in the embodiment of FIG. 1; and FIG. 7 is a schematic wiring diagram illustrating the circuitry employed in the illustrated embodiment of the invention.

Figures 1, 2:
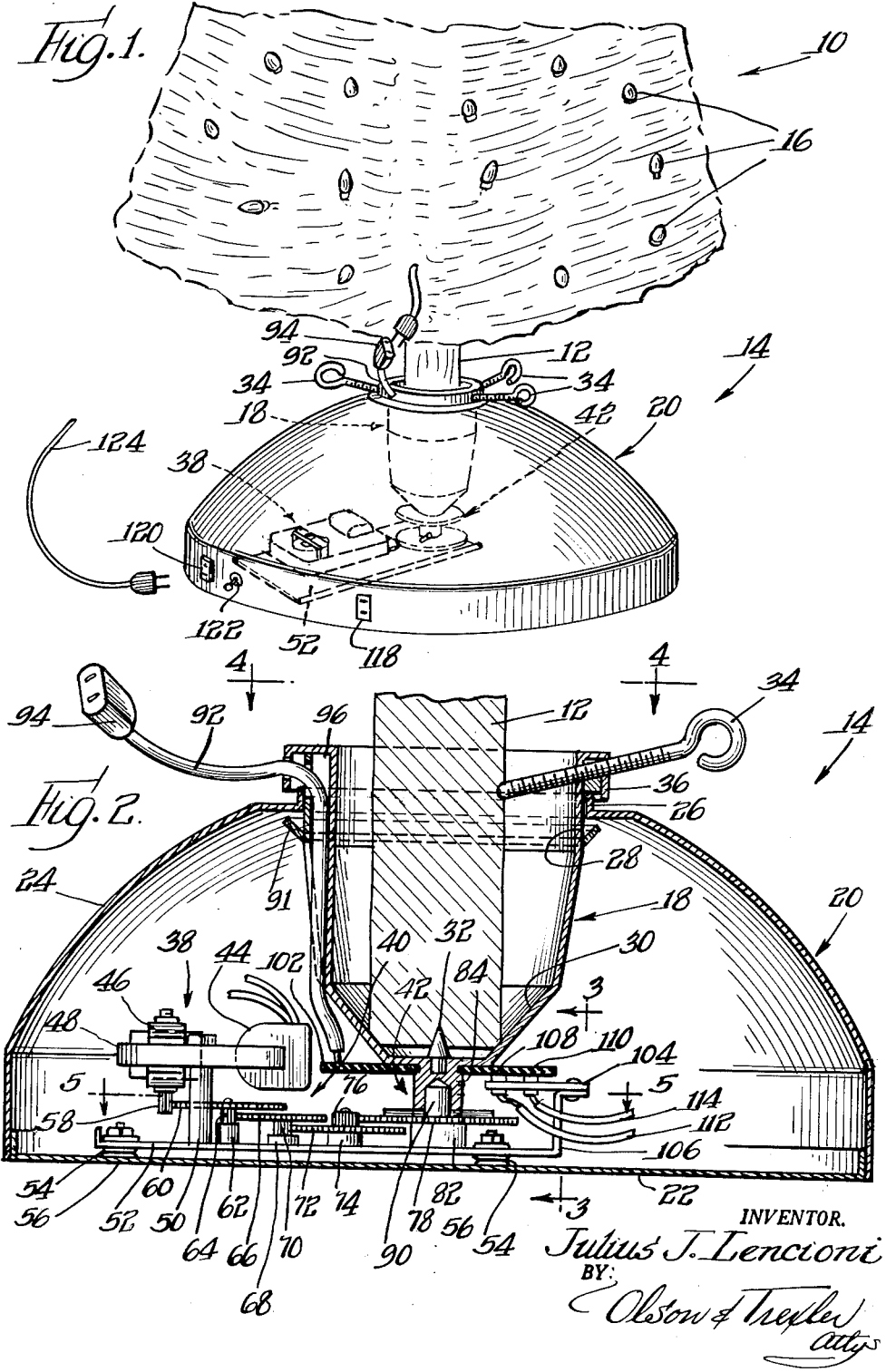
FIG. 1 is a perspective view partially in invisible outline of a display stand constructed in according with the invention and shown supporting a Christmas tree.
FIG. 2 is an enlarged, central cross-sectional view of the display stand of FIG. 1.

Referring now in detail to the drawings, specifically to FIG. 1, a Christmas tree indicated generally by the numeral 10 will be seen supported in an upright position by means of having its basal stem 12 fixedly received in a display stand illustrated at 14. In compliance with the invention, the tree 10 can take any of the customary forms and may specifically comprise an artificial tree fabricated from metal foil or other suitable material. Moreover, tree 10 may specifically comprise a pine, spruce or fir tree which is allowed to remain in its natural condition, is flocked or is otherwise suitably decorated. In any of these circumstances, the tree 10 may be illuminated with one or more conventional strings of colored lights 16; and while the tree 10 is illuminated by the lights 16, it may be revolved in a manner to be described more fully hereinbelow.

The stem 12 of tree 10 is received into a cup 18 that is mounted, in turn, in a base support 20; and as will be seen from an inspection of FIG. 2, the base support 20 includes a flat, circular, floor-engaging plate 22. A shell 24 is superposed on plate 22 and is suitably affixed to the plate 22 as by press fitting, welding or other well known means. At its upper end, shell 24 terminates in an upstanding collar 26 which defines a throat, vertically spaced above and coaxial with plate 22. So arranged and disposed, the collar 26 is adapted to engage a sidewall portion 28 of the cup 18 in bearing relationship.

In one specific embodiment of the invention, cup 18 has been adapted to accommodate trees having stems as much as four inches in diameter. Under such circumstances, plate 22 is arranged to be of sufficient diameter to ensure stable support for the tree.

With continuing reference to FIG. 2, the cup 18 will be observed to include sidewall portions 30 which taper inwardly toward the bottom of the cup in order to guide the stem 12 in the direction of a pointed element 32, element 32 being centrally upraised from the bottom of cup 18 in order to engage the stem 12 piercingly.

Cooperating with the pointed element 32 in fixedly receiving the stem 12 are a number of eyebolts 34 which extend threadedly through a skirt-like element 36 peripherally depending from the upper end of cup 18. The eyebolts 34 are equally arcuately spaced about element 36 and also threadedly extend through sidewall portion 28 in order to engage stem 12 in either an abutting or a piercing manner. It is to be observed that eyebolts 34 are slightly angulated in a downward direction to aid in securing the stem 12 in proper position. It is to be recognized that thumb screws and other suitable fasteners may be readily substituted for the eyebolts 34.

When tree 10 takes the form of a natural tree, it is usually desired to provide water to the stem 12 in order to discourage the tree from shedding needles and to prolong its beauty. Accordingly, the cup 18, the pointed element 32, the sidewall portions 28 and 30 and the skirt-like element 36 are advantageously fashioned into a unitary, fluid-tight member as by being die-cast from a suitable alloy. Moreover, the skirt-like element 36 is desirably arranged to overlap the upper edge of collar 26 vertically for preventing water splashed out of the cup 18 from entering the shell 24.

In accordance with an important feature of the invention, means are provided for rotating the cup 18 and thereby revolving the tree 10. These means include an electric motor 38, a speed reducing gear train 40 and overriding clutch means 42. Motor 38 advantageously comprises a field coil 44, a rotor 46 and a magnet plate 48, as is best shown in FIG. 2. Motor 38 is spaced above plate 22 by means of a mounting post 50 that is secured between magnet plate 48 and a support plate 52, support plate 52 being spaced, in turn, from plate 22 by means of insulating washers 54 and nut-and-bolt arrangements 56.

The output shaft of rotor 46 terminates in a drive pinion 58, pinion 58 serving as the input to gear train 40. The gear train 40 specifically comprises a number of drive sets, each drive set being made up of a spur gear having a pinion gear fixedly joined thereto. Specifically, gear train 40 comprises an input spur gear 60 vertically rotatably mounted to a boss 62 and coaxially fixed to a pinion gear 64. The pinion gear 64 meshes with an intermediate spur gear 66 which is vertically rotatably mounted to a boss 68, a pinion gear 70 being coaxially secured to the intermediate spur gear 66. Another intermediate spur gear 72 is vertically rotatably mounted to a boss 74 and has an output pinion gear 76 fixed to it in coaxial relationship. This arrangement of the gear train 40 is illustrated in FIGS. 2 and 5.

Completing the mechanical connection between motor 38 and cup 18 is a spur gear 78 which meshes with output pinion gear 76 and which, as is well shown in FIG. 6, has the male elements 80 of clutch 42 upstanding from its upper cheek. Gear 78 is rotatably mounted to a boss 82 which is secured to the plate 52 beneath the cup 18.

The system for driving cup 18 is advantageously arranged for quiet operation; and to achieve this end, one or more of the gears in the train 40 is desirably fabricated from nylon resin. In compliance with one important form of the invention sufficient gears in the train 40 are fabricated from nylon resin to provide no metal-to-metal meshing.

A post 84 is secured to cup 18 in coaxially disposed depending relationship, as by being die-cast therewith; and post 84 contains the female elements 86 of the overriding dog clutch 42. When gear 78 is provided with two male clutch elements 80, it is advantageous to provide post 84 with four female clutch elements 86, as shown. So arranged, the clutch can achieve an engaged condition at ninety degree arcuate intervals when the rotation of tree 10 is obstructed.

In order to allow the female clutch elements 86 to ride vertically upward and out of engagement with the male clutch elements 80 without misaligning the gear 78 and the post 84, the post 84 is provided with an axial bore 88 which is adapted to receive a stub shaft 90 which upstands coaxially from the gear 78. This arrangement is shown in FIG. 6. A spring washer or retainer 91, shown in FIG. 2, may be urged onto cup 18 beneath collar 26 to restrict upward movement of the cup and thereby the upward movement of post 84.

In accordance with another important feature of the invention, means are provided for making electrical connection to the lights 16; and complying with the illustrated embodiment of the invention, these means include a flexible cable 92 terminating at one end in a female receptacle 94, the receptacle 94 being arranged to receive the pronged plug commonly provided on strings of Christmas tree lights. Flexible cable 92 and receptacle 94 are shown in FIGS. 1 and 2.

The cable 92 is adapted to pass through an aperture in the skirt-like element 36, as is shown in FIG. 2. From thence, it passes through a channel 96 provided by inwardly forming the sidewall 28, as is best shown in FIG. 4. Having passed through the channel 96, the two conductors contained in cable 92 are respectively fastened to annular, concentric slip ring elements 98 and 100. Elements 98 and 100 are secured to the underside of a disc 102 by printed circuit methods as is indicated generally in FIG. 5. Returning to FIG. 2, the disc 102 will be seen fixedly mounted to and coaxial with the post 84.

An insulating panel 104 is fastened to a bracket 106 beneath and parallel to disc 102 in order to extend brushes 108 and 110 into electrical contact with slip rings 98 and 100 respectively. Various aspects of this latter arrangement will be seen in FIGS. 2, 3 and 5. Appropriately, brushes 108 and 110 are individually connected to electrical leads 112 and 114 respectively.

In accordance with a further importance feature of the invention, circuit means are provided for energizing motor 38 without energizing lights 16, for energizing motor 38 with simultaneous energization of lights 16 and for exclusive energization of lights 16. These circuit means are illustrated schematically in FIG. 7 where a receptacle 118 and a receptacle 120 are shown suitably interconnected. Receptacles 118 and 120 are of a type which establishes an open circuit when no male plug is inserted therein. Since receptacle 118 is associated with that portion of the circuit containing motor 38, it is denoted as the rotation outlet. In like manner, since receptacle 120 is associated only with the slip rings carried by disc 102, this receptacle is denoted as the stationary outlet.

Advantageously, a toggle switch 122 is connected in series with motor 38 to facilitate selective operation of the motor and thereby selective operation of the revolving of tree 10. The receptacles 118 and 120 and the switch 122 are situated about the shell 24, as is best shown in FIG. 1, the receptacles 118 and 120 being situated for convenient connection to the customarily available electrical outlets as by means of a drop cord 124.

From the descriptions thus far given, it is apparent that the Christmas tree 10 may be mounted in the stand 14 by directing the stem 12 into the cup 18 so that the bottom of the stem engages the tapered sidewall portions 30. These guide the stem into engagement with the pointed element 32. Subsequently, eyebolts 34 are turned into engagement with the stem 12 while the tree 10 is being held upright whereby to complete installation.

Thereafter, tree 10 may be revolved by inserting the pronged plug of drop cord 124 into the rotation receptacle 118 and closing the switch 122. Thereby, motor 38 will be energized to drive the clutch 42 through gear train 40. The cup 18 will be thus rotated about its vertical axis and the tree 10 will be revolved.

As will be recognized, should tree 10 encounter an obstruction, as for example draperies or the body of some person standing too close to the tree, motor 38 will continue to drive the clutch 42; but the torque imposed on the stem 12 by means of the obstruction will result in the female elements 86 of the clutch riding up out of engagement with the male elements 80. In this manner, gear 78 will continue to rotate; however, cup 18 and tree 10 will cease to revolve and will merely oscillate vertically as the post 84 overrides the gear 78. It is to be recognized that this arrangement of the invention allows tree 10 to stall without tipping the tree or damaging the drive mechanism when an obstruction tending to hold the tree is encountered.

If it is desired to illuminate the tree 10 by means of customary strings of lights such as the lights 16, the pronged plug associated with the string of lights may be connected into the circuit by means of the receptacle 94; and electrical connection with the source of power will be achieved through the conductors in cable 92, the slip rings 98 and 100, the brushes 108 and 110, and the leads 112 and 114. One embodiment of the circuitry for energizing the lights 16 while tree 10 is being rotated by motor 38 is illustrated in FIG. 7. It is to be noted that this general arrangement of the circuitry of the invention is permissive of deenergizing motor 38, as through switch 122, while energization of lights 16 is continued.

Moreover, the display stand of the invention is embodied to permit energization of the lights 16 while excluding the possibility of energizing motor 38. This arrangement is achieved by connecting stationary receptacle 120 to a source of power as by means of the drop cord 124. From an inspection of FIG. 7, it will become apparent that, with the circuitry thus energized, motor 38 can in no way be energized yet a circuit is completed to the lights 16.

The specific embodiment herein shown and described should be considered as illustrative only. Various changes in structure will, no doubt, occur to those skilled in the art; and these changes are to be understood as forming a part of this invention insofar as they fall within the spirit and scope of the appended claims.

The invention is claimed as follows:

1. An ornamental display stand including a base to rest on a supporting surface and throat means spaced thereabove, receiving means mounted for rotation about a vertical axis and for limited vertical movement along the said vertical axis and extending through said throat means and adapted to receive the base of an ornamental element, power means for rotating said receiving means relative to said throat means and including a gear mounted for rotation about the vertical axis of rotation of said receiving means, and overriding clutch means connecting said gear and said receiving means and including therebetween a telescopic connection and mutually cooperable ribs and grooves operable when the ribs and grooves are in mutual engagement to rotate the receiving means and operable to permit the ornamental element and the receiving means to stall upon encountering an obstruction by disengaging the rib and groove means with vertical shifting of the receiving means through its telescopic connection with said gear while permitting the power means to continue in operation.

2. An ornamental display stand as claimed in claim 1, wherein the throat means engages the receiving means to cooperate with the telescopic connection between the receiving means and said gear to maintain the axial alignment of said receiving means and said gear upon relative vertical movement therebetween.

References Cited in the file of this patent

UNITED STATES PATENTS

| | | |
|---|---|---|
| 626,514 | Wagner | June 6, 1899 |
| 1,988,343 | Tacy | Jan. 15, 1935 |
| 2,587,788 | Tacy | Mar. 4, 1942 |
| 2,736,854 | Will | Feb. 28, 1956 |